United States Patent
Kim et al.

(10) Patent No.: US 10,038,480 B2
(45) Date of Patent: Jul. 31, 2018

(54) POWER CONTROL METHOD AND DEVICE FOR FORMING MULTIPLE BEAMS IN WIRELESS COMMUNICATION SYSTEM

(71) Applicant: Samsung Electronics Co., Ltd., Suwon-si, Gyeonggi-do (KR)

(72) Inventors: Taeyoung Kim, Seongnam-si (KR); Hyunkyu Yu, Suwon-si (KR); Jiyun Seol, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/413,308

(22) PCT Filed: Jul. 19, 2013

(86) PCT No.: PCT/KR2013/006500
§ 371 (c)(1),
(2) Date: Jan. 7, 2015

(87) PCT Pub. No.: WO2014/014315
PCT Pub. Date: Jan. 23, 2014

(65) Prior Publication Data
US 2015/0195015 A1 Jul. 9, 2015

(30) Foreign Application Priority Data
Jul. 19, 2012 (KR) ........................ 10-2012-0078527

(51) Int. Cl.
*H04B 7/04* (2017.01)
*H04B 7/0426* (2017.01)
(Continued)

(52) U.S. Cl.
CPC ........... *H04B 7/043* (2013.01); *H04B 7/0695* (2013.01); *H04W 52/42* (2013.01); *H04W 16/28* (2013.01)

(58) Field of Classification Search
CPC .. H04B 7/0697; H04B 7/0632; H04B 7/0452; H04B 7/043; H04B 7/0434;
(Continued)

(56) References Cited

U.S. PATENT DOCUMENTS

2006/0034382 A1* 2/2006 Ozluturk ............... H04L 5/0025
375/267
2006/0111055 A1* 5/2006 Frew .................... H01Q 3/2605
455/101
(Continued)

FOREIGN PATENT DOCUMENTS

KR 10-2007-0081381 A 8/2007
KR 10-2010-0064278 A 6/2010
KR 10-2011-0082050 A 7/2011

*Primary Examiner* — Jung Liu
(74) *Attorney, Agent, or Firm* — Jefferson IP Law, LLP

(57) ABSTRACT

The present invention relates to a power control method for transmission beams in a wireless communication system using a beam-forming technique and a device for supporting same. A method of controlling power by a base station according to an embodiment of the present invention includes: determining at least one transmission beam to use for at least one sub carrier; determining an output power gain adjustment value for each of the transmission beams based on information on the transmission beams; and applying the output power gain adjustment value to each of the transmission beams. According to the present invention, if the number of transmission beams varies depending on the situation, there is the effect that it is possible to equally control an output power value irrespective of the number of beams.

19 Claims, 9 Drawing Sheets

(51) Int. Cl.
*H04B 7/06* (2006.01)
*H04W 52/42* (2009.01)
*H04W 16/28* (2009.01)

(58) Field of Classification Search
CPC ... H04B 7/0443; H04B 7/0413; H04L 1/0026; H04L 25/0248; H04L 27/2601; H04L 27/2602; H04W 72/0413; H04W 52/146; H04W 72/085; H04W 52/346; H04W 28/18; H04W 52/42
See application file for complete search history.

(56) References Cited

U.S. PATENT DOCUMENTS

| | | | | |
|---|---|---|---|---|
| 2006/0121946 A1* | 6/2006 | Walton | ........... | H04B 7/0417 455/561 |
| 2006/0148437 A1* | 7/2006 | Krivokapic | ....... | H04W 52/0238 455/232.1 |
| 2007/0218952 A1* | 9/2007 | Koo | ........... | H04B 7/043 455/562.1 |
| 2008/0132281 A1* | 6/2008 | Kim | ........... | H04B 7/063 455/562.1 |
| 2008/0144733 A1* | 6/2008 | Elgamal | ........... | H04L 1/0003 375/267 |
| 2009/0042511 A1* | 2/2009 | Malladi | ........... | H04L 5/023 455/62 |
| 2010/0091743 A1* | 4/2010 | Kazmi | ........... | H04B 7/0417 370/336 |
| 2010/0166098 A1* | 7/2010 | Luz | ........... | H04B 7/0413 375/267 |
| 2010/0296591 A1* | 11/2010 | Xu | ........... | H04B 7/0613 375/259 |
| 2010/0322330 A1* | 12/2010 | Jongren | ........... | H04B 7/0452 375/260 |
| 2011/0026630 A1* | 2/2011 | Stager | ........... | H04B 7/0439 375/267 |
| 2011/0096815 A1* | 4/2011 | Shin | ........... | H04B 7/0689 375/219 |
| 2011/0210892 A1* | 9/2011 | Shany | ........... | H01Q 3/26 342/373 |
| 2012/0281780 A1* | 11/2012 | Huang | ........... | H04B 7/0452 375/267 |

* cited by examiner

POWER CONTROL METHOD AND DEVICE FOR FORMING MULTIPLE BEAMS IN WIRELESS COMMUNICATION SYSTEM

TECHNICAL FIELD

The present invention relates to per-frequency path power control method and apparatus in a beamforming system operating on the millimeter wave band. In detail, the present invention relates to a technique of controlling output power value of an antenna by adjusting output gain per Radio Frequency (RF) path in an environment where the number of beams varies depending on the user.

BACKGROUND ART

Mobile communication systems were developed to provide the subscribers with voice communication services on the move. With the rapid advance of technologies, the mobile communication systems have evolved to support high speed data communication services beyond the early voice-oriented services. In line with this, the mobile data traffic demand is increasing rapidly and therefore there is a need of high data rate.

There are two approaches to improve for increasing data rate: widening frequency band and improving frequency utilization efficiency. In the latter case, however, the frequency utilization efficiencies of the present communication technologies have reached to the logical upper limit already, there is little room for improving the frequency utilization efficiency through technical enhancement. As a consequence, the focus is now on the technology of using a wide frequency band.

Since it is difficult to secure a wide frequency band in the frequency spectrum (<5 Ghz) occupied by the present cellular mobile communication systems, the consideration is taken into the higher frequency band spectrum for broadband service. Since the frequency band available for broadband communication over 1 GHz is limited, discussions are focused on the radio communication in the millimeter wave band over 30 GHz.

However, such a high-frequency band communication has a drawback in that the signal attenuation increases significantly as the propagation distance increases. In detail, as the frequency increases, the propagation pathloss increases and the propagation distance decreases, resulting in reduction of the service coverage. One of the key technologies to mitigate the propagation pathloss and increase the propagation distance is beamforming.

The transmission beamforming is a technology to focus the signals transmitted by a plurality of antennas on a certain direction. An antenna system formed with a plurality of antennas is called array antenna, and the antennas constituting the array antenna are called element antennas or antenna elements. With the use of the transmission beamforming technique, it is possible to increase the signal propagation distance and reduce interference to other users significantly due to the directionality of the signal.

It is also possible to use reception beamforming at the recipient side using a reception array antenna to focus the reception on a certain direction, thereby increasing the signal reception sensitivity and avoiding interference signals in other directions than the intended.

Such a beamforming technique is advantageous for use in the high frequency band communication system. Since the wavelength is shortened as the frequency increases, it is possible to implement an array antenna with large amount of antennas within the same area by arranging the antennas at half wavelength interval. This means that the communication system operating on the high frequency band can achieve relatively high beamforming gain (antenna gain) as compared to the communication system operating on the low frequency band.

DISCLOSURE OF INVENTION

Technical Problem

The present invention aims to provide a method and apparatus for controlling total output value of an array antenna at small cost by adjusting the output gain per RF path in a beamforming system which is provided with a Power Amplifier (PA) having a fixed output value and capable of changing a number of beams depending on the user.

In more detail, in the case of using the beamforming system operating on a ultrahigh frequency band like the transmission end structure with a PA having an output value fixed according to the fixed number of antennas like the legacy $4^{th}$ Generation (4G) system, the PA connected to each array antenna has a fixed output value independently of the number of multibeams and thus the total output value of radiation varies depending on the number of RF paths, i.e. number of multibeams. Since the transmit power increases as the number of multibeams increases, there is a need of compensating for this.

One approach is to set the PA connected to the array antenna to a value varying according to the number of RF paths in use rather than a fixed value. However, this method is not preferable because the cost of the PA device increases due to the maximum output value and broad output value range of the PA. The present invention aims to provide a power control method and apparatus that is capable of adjusting the output gain per RF path according to the number of multibeams per user at a relatively small cost.

Solution to Problem

The present invention has been conceived to solve the above problem. In accordance with an aspect of the present invention, a power control method of a base station in a wireless communication system using a beamforming scheme includes determining at least one transmission beam for use in at least one subcarrier, calculating an output gain adjustment value per transmission beams based on transmission beam information, and applying the output gain adjustment value to the at least one transmission beam respectively.

In accordance with another embodiment of the present invention, a base station for controlling power in a wireless communication system using a beamforming scheme includes a transceiver which is responsible for transmitting and receiving signals to and from a terminal and a control unit which determines at least one transmission beam for use in at least one subcarrier, calculates an output gain adjustment value per transmission beams based on transmission beam information, and applies the output gain adjustment value to the at least one transmission beam respectively.

In accordance with an aspect of the present invention, a power control method of a terminal includes determining at least one transmission beam for transmitting uplink signal, determining an output gain adjustment value per transmission beam based on transmission beam information, and applying the output gain adjustment value per transmission beam.

In accordance with another aspect of the present invention, a terminal includes a transceiver which is responsible for transmitting and receiving signals to and from a base station and a control unit which determines at least one transmission beam for use in uplink signal transmission, calculates an output gain adjustment value per transmission beam based on transmission beam information, and applies the output gain adjustment value to the at least one transmission beam respectively.

In accordance with still another aspect of the present invention, a communication method of a terminal in a wireless communication system using a beamforming scheme includes transmitting, at a base station, information for use in determining at least one transmission beam to be used in at least one subcarrier and receiving the transmission beam to which an output gain adjustment value is applied from the base station, wherein the output gain adjustment value is determined by the base station based on the transmission beam information for at least one transmission beam for use in at least one subcarrier.

Advantageous Effects of Invention

The power control method and apparatus of the present invention is advantageous in terms of controlling the total output value of an array antenna efficiently by adjusting the per-RF path output gains even when the number of beams changes according to the situation in an ultrahigh frequency band beamforming system.

Also, the power control method and apparatus of the present invention is advantageous in terms of allowing for designing a cost-effective antenna capable of controlling power using the PA having a fixed output value independently of the variation of the number of beams in accordance with the situation.

MODE FOR THE INVENTION

Exemplary embodiments of the present invention are described with reference to the accompanying drawings in detail. Detailed description of well-known functions and structures incorporated herein may be omitted to avoid obscuring the subject matter of the present invention.

Figure 1:
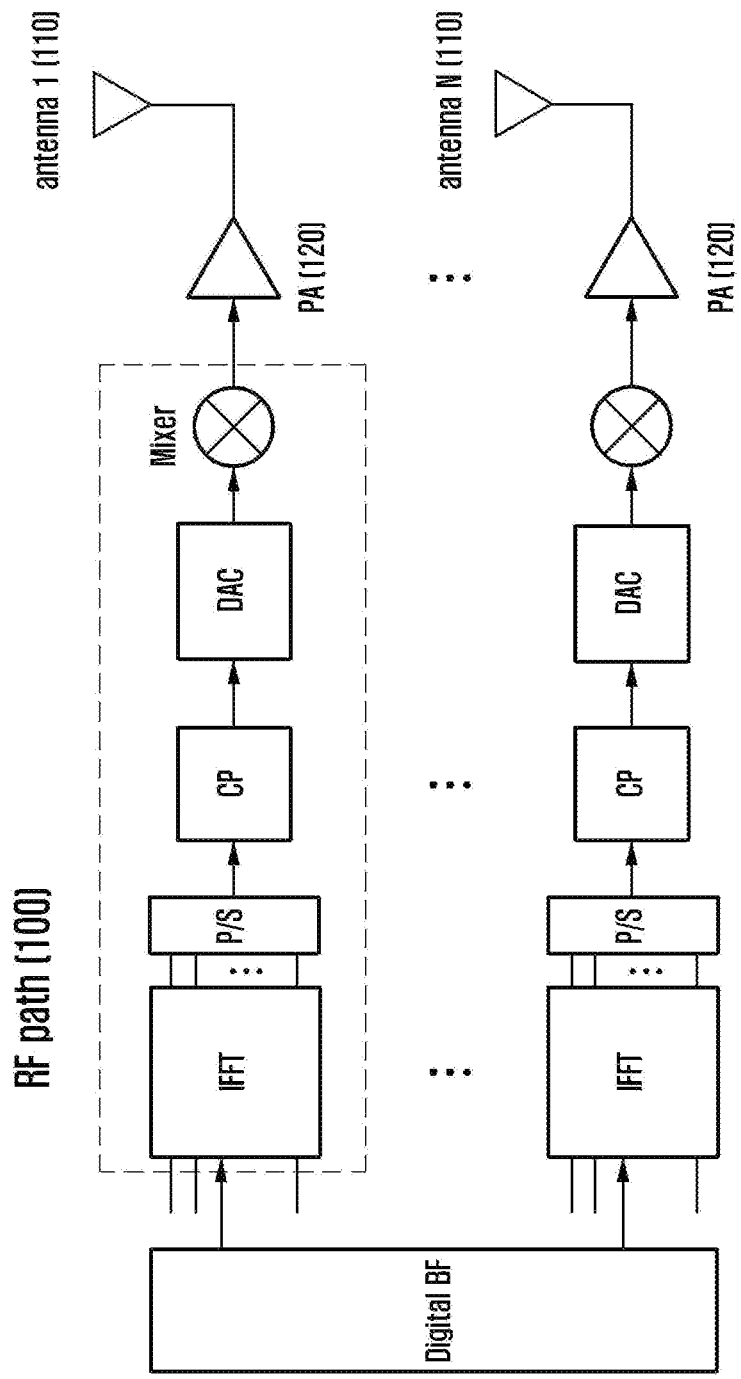
FIG. 1 is a block diagram illustrating the transmitting end of a legacy MIMO communication system operating on the cellular frequency band (<5 GHz).

FIG. 1 is a block diagram illustrating the transmitting end of a legacy MIMO communication system operating on the cellular frequency band (<5 GHz). In the MIMO communication system, an RF path 100 includes an IFFT/FFT module, a DAC/ADC module, and a Mixer as shown in FIG. 1.

In the legacy MIMO communication system operating on the cellular frequency band (5 GHz), a number of transmit antennas 110 is limited by physical antenna size and distance between the antennas which is in proportion to the operation frequency wavelength. For example, the MIMO system made up of up to 8 antennas is applied to the 4G mobile communication system. The conventional MIMO communication system is implemented in such a way that the RF paths 100 identical in number with the limited number of antennas are connected to the corresponding antennas directly.

In the legacy MIMO mobile communication system operating on the cellular frequency band, the number of transmit antennas is fixed. The number of transmit antennas is determined and implemented depending on the mobile carrier's preference. Accordingly, the maximum power value of the PA 120 is determined according to the number of antennas in use.

For example, assuming that the total output power of the antennas is P and the number of transmit antenna is N, the maximum output power of the per-antenna PA 120 is fixed to P/N. In the legacy MIMO communication system, the PA 120 is implemented with a device having a maximum transmit power set to a constant value regardless of the number of users and the number of streams transmitted simultaneously.

For reference, the larger the maximum output value and output power range of the PA is, the higher the price of the PA device. Accordingly, it is preferred to use a PA device of which maximum output power and the output power range are as little as possible.

Figure 2A:
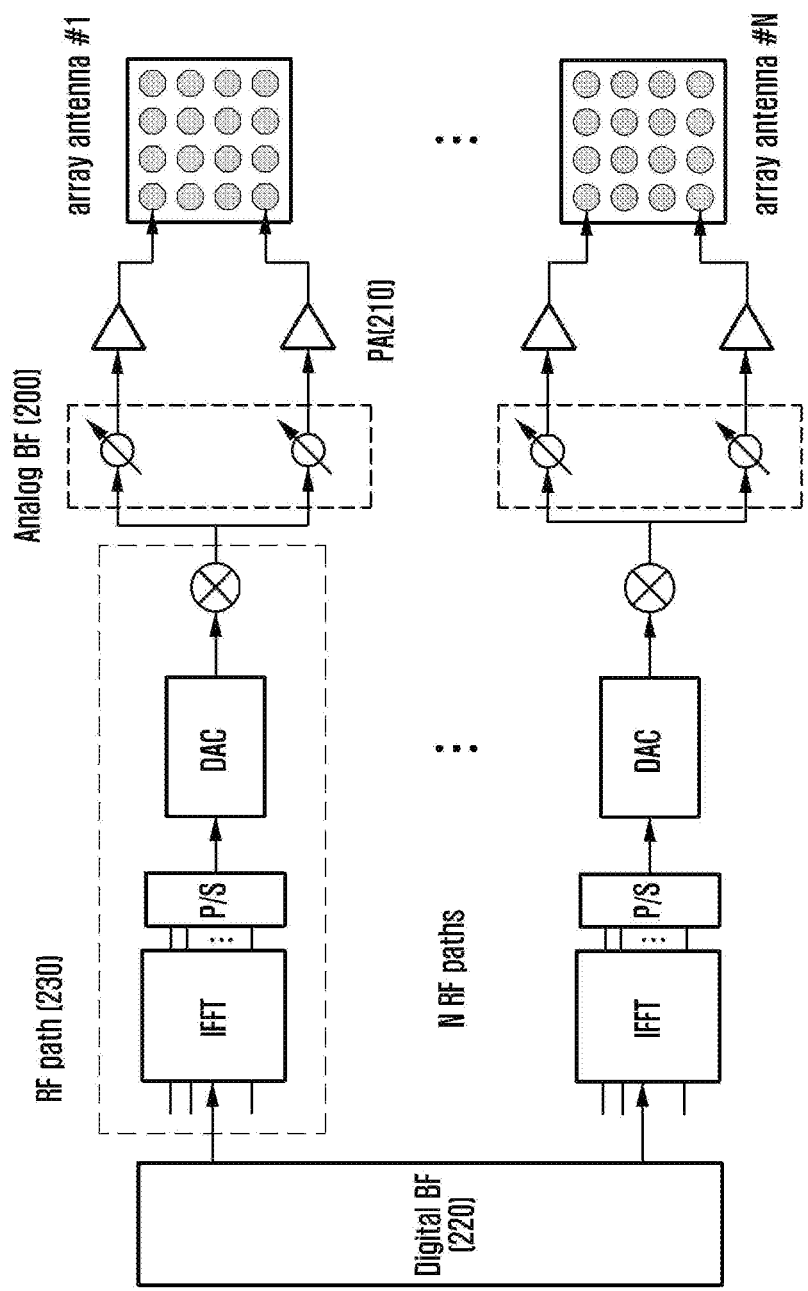
FIGS. 2A and 2B are block diagrams illustrating configurations of the transmitting end of the MIMO communication system based on a Hybrid Beamforming (BF) structure which operates on the ultrahigh frequency band according to embodiments of the present invention.
Figure 2B:
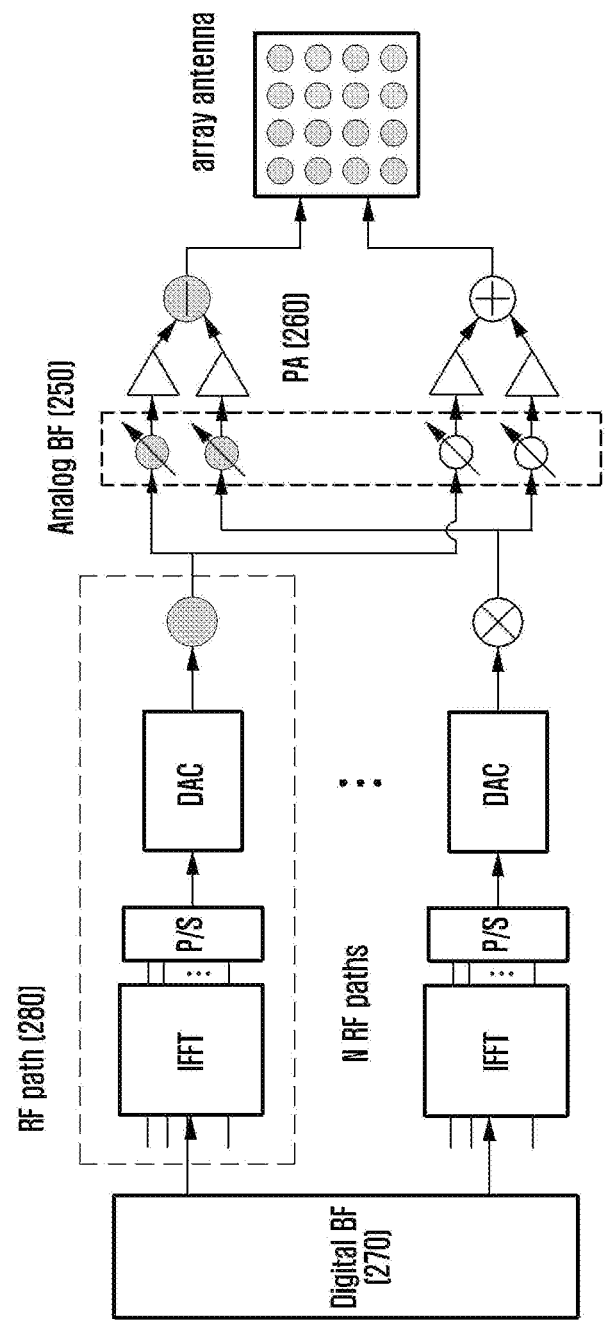

FIGS. 2A and 2B are block diagrams illustrating configurations of the transmitting end of the MIMO communication system based on a Hybrid Beamforming (BF) structure which operates on the ultrahigh frequency band according to embodiments of the present invention.

As described above, the system operating on the ultrahigh frequency band is advantageous in terms of allowing to arrange a large number of antennas in the same area as compared to the system operating on the cellular frequency band because of the short frequency wavelength of the ultrahigh frequency. By this nature, it is possible to obtain high beam gain and compensate for the propagation path loss which is significant as compared to the cellular frequency band.

As shown in FIG. 2, the Hybrid BF structure considered in the present invention includes an analog BF unit 200 (250) and a digital BF unit 220 (270). According to an embodiment, it is possible to obtain high beam gain through the analog BF and extra data rate improvement through various digital BF-based MIMO techniques known in the art.

The power control method and apparatus of the present invention may be implemented selectively with one of the Hybrid BF structures as shown in FIGS. 2A and 2B. The structures of FIGS. 2A and 2B are identical with each other with the exception whether one array antenna is connected to one RF path 230 in FIG. 2A or connected to multiple RF paths 280. FIG. 2A shows the case where one array antenna is connected to one RF path 230, and FIG. 2B shows the case where one array antenna is connected to multiple RF paths 280.

Unlike the transmitting end structure of the legacy MIMO communication system in which one RF path 100 is connected to one antenna 110 as shown in FIG. 1, the Hybrid BF structure according to an embodiment of the present invention includes at least one analog BF unit 200 (250) such that one RF path 230 (280) can be connected to an array antenna made up of a plurality of antennas as shown in FIGS. 2A and 2B. As shown in FIG. 2, the Hybrid BF of the present invention can transmit only one RF path 230 (280) signal through the beam formed by the analog BF unit 200 (250).

At this time, the number of RF paths may vary depending on the base station. However, it does not mean to use all the RF paths always as in the legacy MIMO communication system. The Hybrid BF according to the present invention is capable of operating part of the RF paths depending on the transmission scheme of the user and the number of users at certain timing. In order to use RF paths, the base station scheduler has to select available users and transmission scheme based on the predetermined number of RF paths and transmit the information thereon.

In FIGS. 2A and 2B, the maximum output power of the PA 210 (260) connected to the array antenna is inversely proportional to the number of antennas forming the array antenna. That is, assuming that the total output power is P and the number of antennas forming the array antenna is N, the maximum output power value of the PA 210 (260) is P/N. For the above described reason, it is preferred to use a PA device of which maximum output power and the output power range are as little as possible even in the ultrahigh frequency BF structure.

Figure 3:
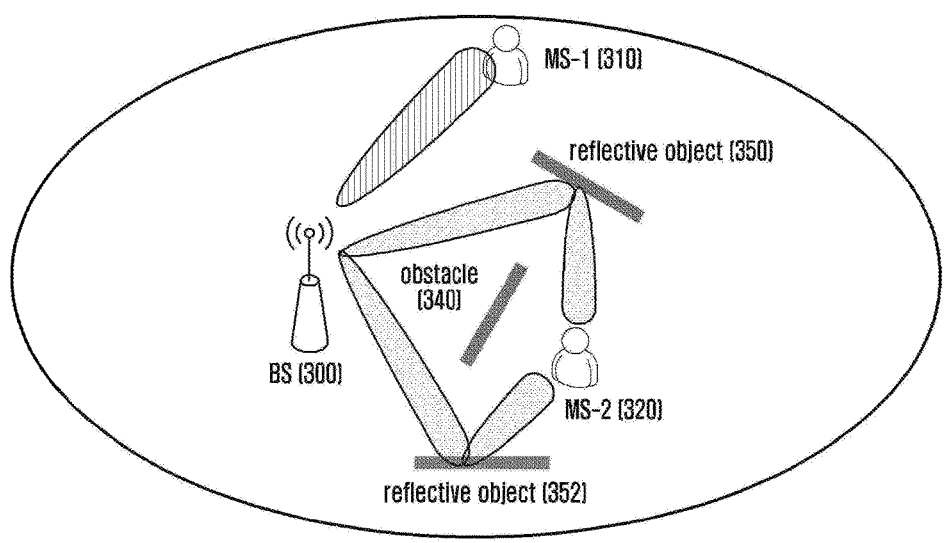
FIG. 3 is a diagram illustrating an exemplary situation for explaining the advantage of using a number of multibeams which varies depending on the user in the ultrahigh frequency band beamforming system according to an embodiment of the present invention.

FIG. 3 is a diagram illustrating an exemplary situation for explaining the advantage of using a number of multibeams which varies depending on the user in the ultrahigh frequency band beamforming system according to an embodiment of the present invention.

In FIG. 3, the base station 300 performs data transmission to the terminals 310 and 320 through beamforming with an array antenna. Referring to FIG. 3, the base station 300 transmits data changing the downlink transmission beam direction using the array antenna. Also, each of the terminals 310 and 320 may receive data changing the reception beam direction.

Although not depicted in FIG. 3, the beamforming-based communication system is capable of allowing the base station 300 and the terminals 310 and 320 to select the direction and number beams among various transmission and reception beams for providing efficient data service. Such a procedure is applicable in the uplink for data transmission from the terminals 310 and 320 to the base station 300 as well as the downlink for data transmission from the base station 300 to the terminals 310 and 320.

FIG. 3 is directed to an exemplary case where the base station 300 is serving the two users 310 and 320 and a number of multibeams is determined differently per user based on the location and of the user and environmental condition.

For example, the MS-1 310 has no obstacle around and thus it is preferred to form one beam directed to the serving base station. Meanwhile, the MS-2 320 has an obstacle 340 so as not to receive the beam in the direction from the base station. However, it is possible to receive the signal reflected against the reflective objects 350 and 352. In this case, it is preferred for the MS-2 320 to receive the two beams reflected against the reflective objects 350 and 352.

This simple example shows that each user has preferable direction and number of beams in consideration of the obstacles and reflective objects around the user in the beamforming-based communication system. That is, it is more efficient approach of guaranteeing stable reception performance in time various environments to determine the direction and number of beams in adaptation to the user environment and location for data transmission.

The present invention is the premise that the number of multibeams is determined per user in adaptation to the user location and environment in the beamforming structure of transmitting data through multibeams.

Figure 4:
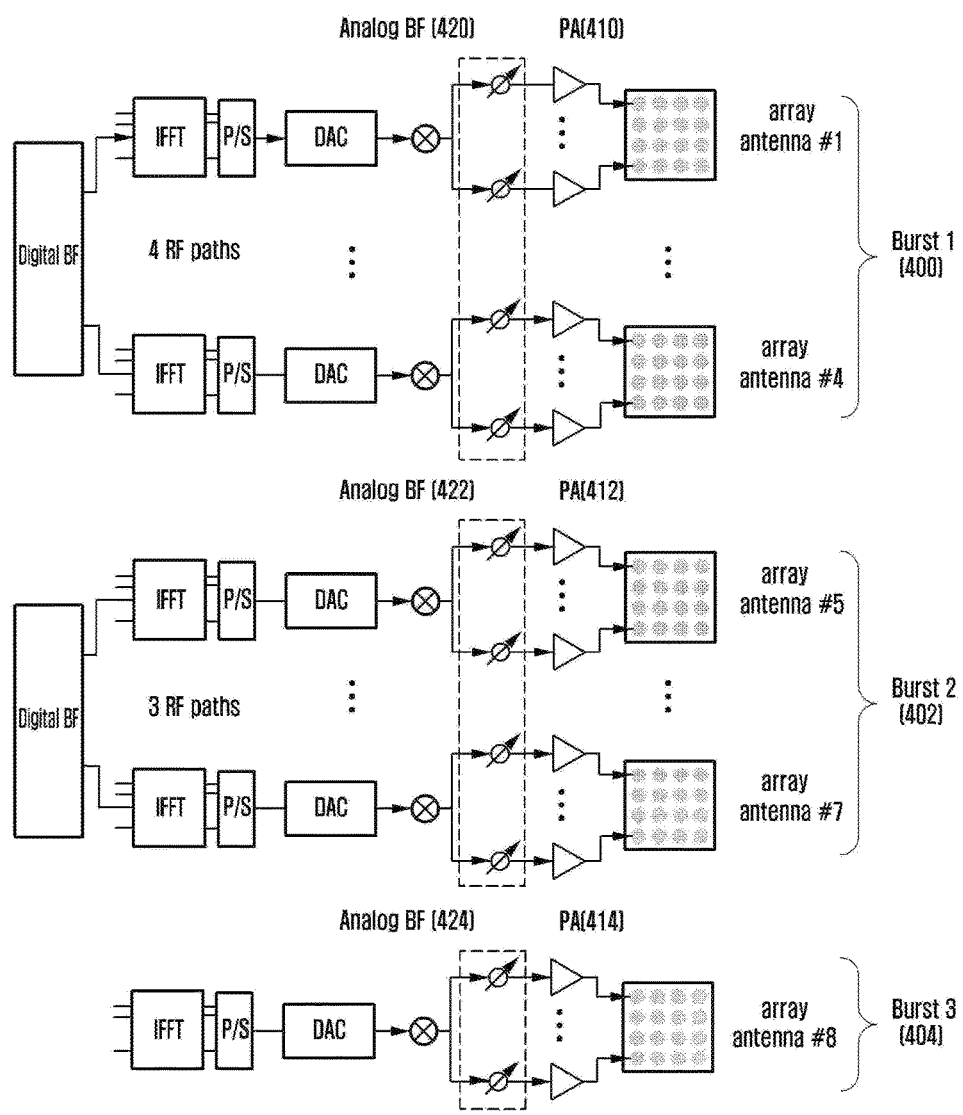
FIG. 4 is a diagram illustrating configurations of the transmitting end of the MIMO communication system for explaining the problems expected in the system supporting different numbers of multibeams for different users using a fixed PA.

FIG. 4 is a diagram illustrating configurations of the transmitting end of the MIMO communication system for explaining the problems expected in the system supporting different numbers of multibeams for different users using a fixed PA.

FIG. 4 exemplifies a situation in which three data burst (blocks 400, 402, and 404) are mapped to different frequency resources in the transmitting end structure made up of 8 RF paths. The data bursts have the different preferable numbers of multibeams. That is, the data burst 1 400 is preferable to use 4 multibeams, the data burst 2 402 is preferable to use 3 multibeams, and the data burst 3 404 is preferable to use 1 multibeam.

In this case, the PAs 410, 412, and 414 connected to the respective array antennas have the fixed output values regardless of the numbers of the multibeams, and this may cause a problem in that the output values corresponding to the RF paths, i.e. the multibeams carrying the data bursts (blocks 400, 402, and 404) are different one another.

The present invention has been proposed to solve the problem in that the transmit power increases as the number of multibeams increases.

In order to accomplish this, it can be considered to set the PAs 410, 412, and 414 connected to the antenna arrays to the values varying according to the number of RF paths to be used other than fixed values. However, this method is not preferable because the cost of the PA device increases due to the maximum output value and broad output value range of the PA. There is therefore a need of a method that is capable of solving the problem brought out from the configuration of FIG. 4.

Figure 5:
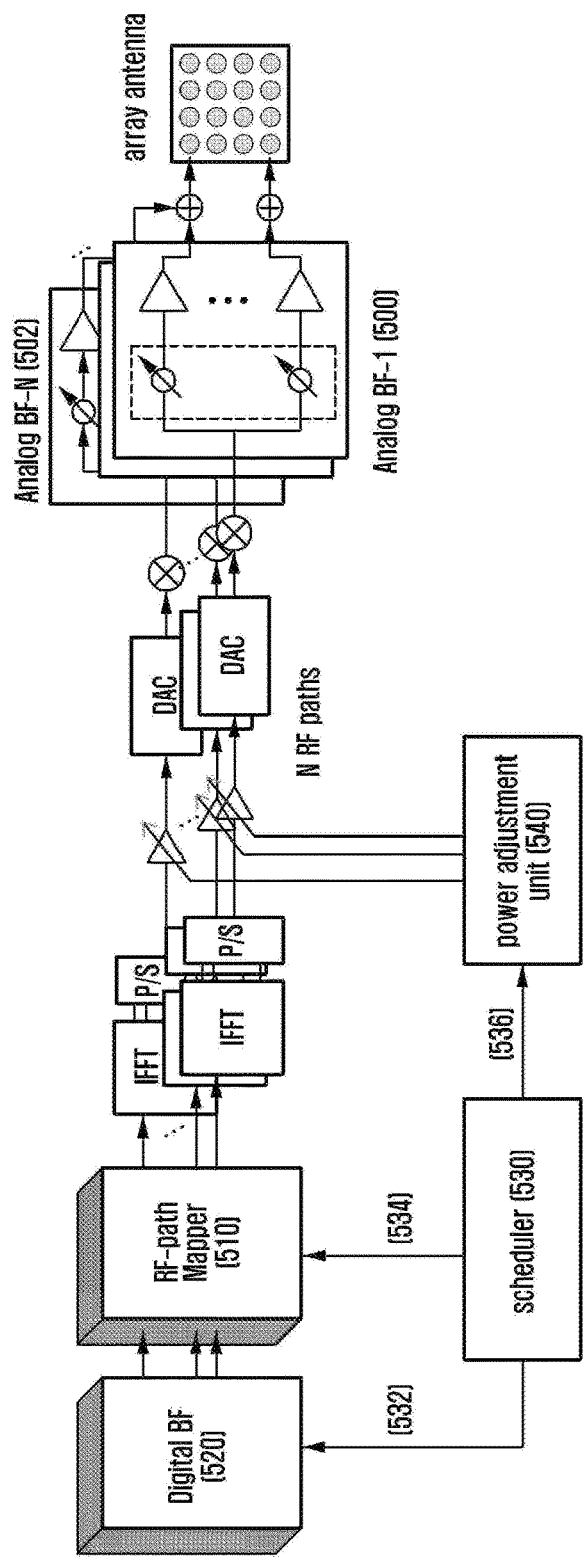
FIG. 5 is a block diagram illustrating a configuration of a power control apparatus of a transmitter using different numbers of multibeams according to an embodiment of the present invention.

FIG. 5 is a block diagram illustrating a configuration of a power control apparatus of a transmitter using different numbers of multibeams according to an embodiment of the present invention.

As shown in FIG. 5, the power control method of the transmitter according to an embodiment of the present invention includes an analog beamforming unit 500, an RF-path mapping unit 510, a digital beamforming unit 520, a scheduler 530, and a power adjustment unit 540. The BF structure exemplified in FIG. 5 similar to that of FIG. 2B in that one array antenna is connected to multiple RF paths 280, where the total number of RF paths established in the corresponding base station is N and the number of RF paths in use is less than N.

As described with reference to FIG. 4, in the case of the PS device of which output is set to a fixed value, there is a need of a device to compensate the output value varying depending on the number of RF paths in use. However, using the RF device of which output value varying depending on the number of RF paths in use instead of the PA device having a fixe output value is not appropriate in view of cost. There is there for a need of a method and apparatus that is capable of changing the output values depending on the numbers of RF paths in use while using the PAs 410, 412, and 414 having fixed output values with relatively small cost and complexity.

The power control apparatus according to the embodiment of FIG. 5 is designed such that the digital end, instead of the analog end, changes the output gain per RF path using the power adjustment unit 540 in consideration of the aforementioned design requirement. In this way, the power control apparatus of FIG. 5 is capable of setting the total output power to a constant value regardless of the number of RF paths or the number of multibeams.

In FIG. 5, the power adjustment unit 540 may receive at least one of index of the RF path in use per subcarrier at the corresponding time point, total number of RF path in use, and MIMO scheme to be applied to the subcarrier from the scheduler 530 as denoted by reference number 536. Afterward, the power adjustment block 540 may determine the appropriate output gain value per RF path based on the received information and MIMO transmission scheme in use.

According to an embodiment, the scheduler 530 may receive predetermined feedback information from the terminal for determining the index of the RF path in use per subcarrier at the corresponding time point, total number of RF path in use, and MIMO scheme to be applied to the subcarrier.

The RF-path mapping unit 510 may receive the information including at least one of total number of RF path in use per subcarrier, index, and MIMO scheme to be applied to the subcarrier as denoted by reference number 534. Afterward, the RF-path mapping unit 510 may map the output gain value determined by the power adjustment unit 540 to the corresponding transmission data stream.

Figure 6:
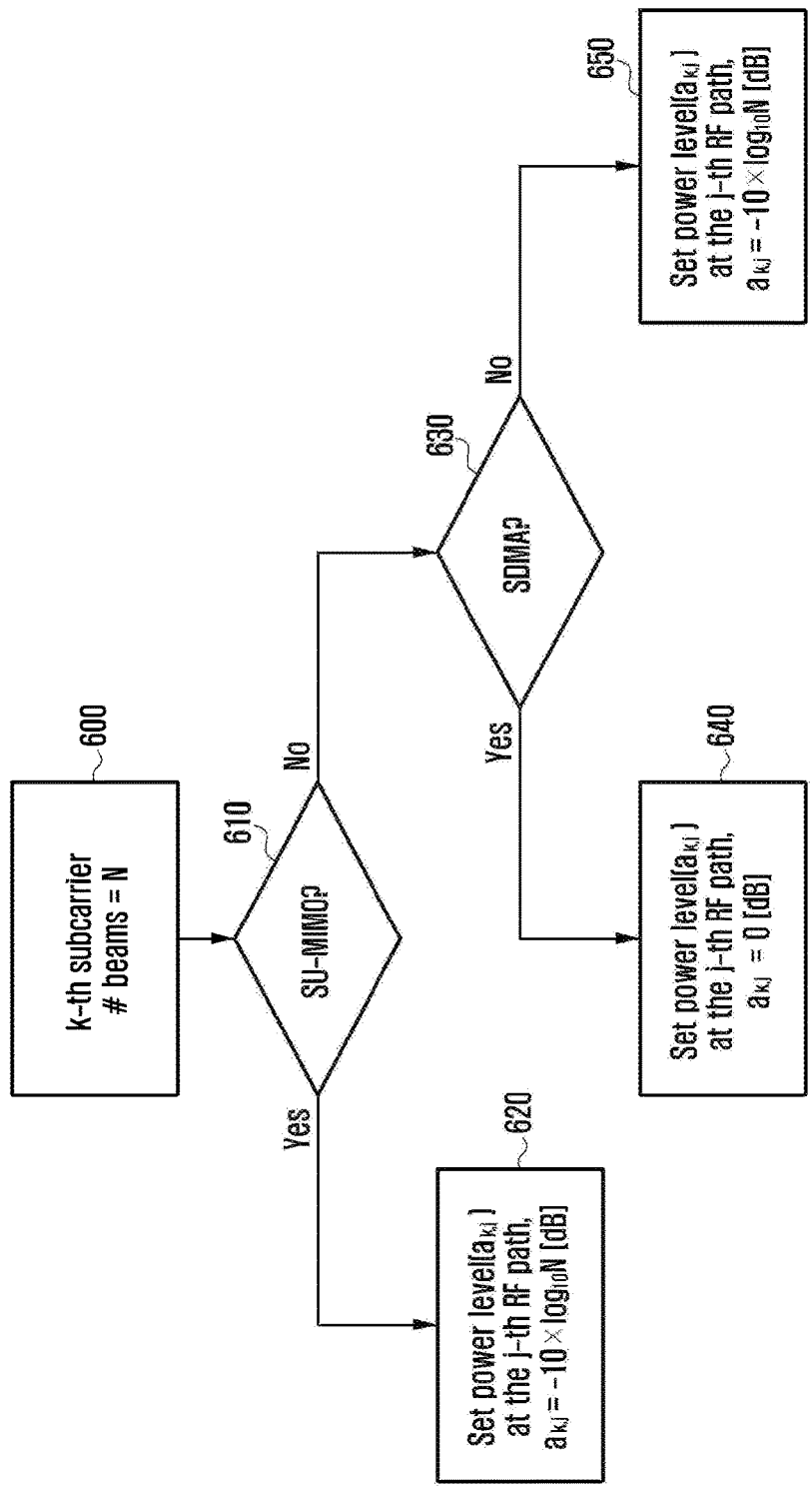
FIG. 6 is a flowchart illustrating a procedure of determining output gain adjustment value depending on the number of RF path at the transmitter according to an embodiment of the present invention.

FIG. 6 is a flowchart illustrating a procedure of determining output gain adjustment value depending on the number of RF path at the transmitter according to an embodiment of the present invention.

The power adjustment unit 540 receives the information on the number of RF paths in use per subcarrier from the scheduler 530 at step 600. If the number of RF paths used by the $k^{th}$ subcarrier is N, the power adjustment unit 540 determines whether the MIMO scheme applied to the $k^{th}$ subcarrier is Single User MIMO (SU-MIMO) or Multiuser MIMO (MU-MIMO) at step 610.

In the case of SU-MIMO, the power adjustment unit 540 sets the output gain adjustment value for the RF path with index J of the $k^{th}$ subcarrier to $-10 \times \log_{10} N$ (dB) at step 620. This means to distribute the output value to the RF paths evenly.

In the case of MU-MIMO, the power adjustment unit 540 determines whether the MU-MIMO is a Special Division Multiple Access (SDMA) MIMO or other MIMO scheme, e.g. digital precoder or Zero Forcing (ZF) MU-MIMO at step 630.

If the MU-MIMO is the SDMA MU-MIMO, this means that the single user data is transmitted through one RF path although there or N RF paths and thus the power adjustment unit 540 sets the output gain adjustment value to 0 (dB) at step 640. Otherwise if the MU-MIMO is a non-ADMA MU-MIMO, this means the data are transmitted through N RF paths and thus the power adjustment unit 540 sets the output gain adjustment value to $-10 \times \log_{10} N$ (dB) like SU-MIMO at step 650.

Figure 7:
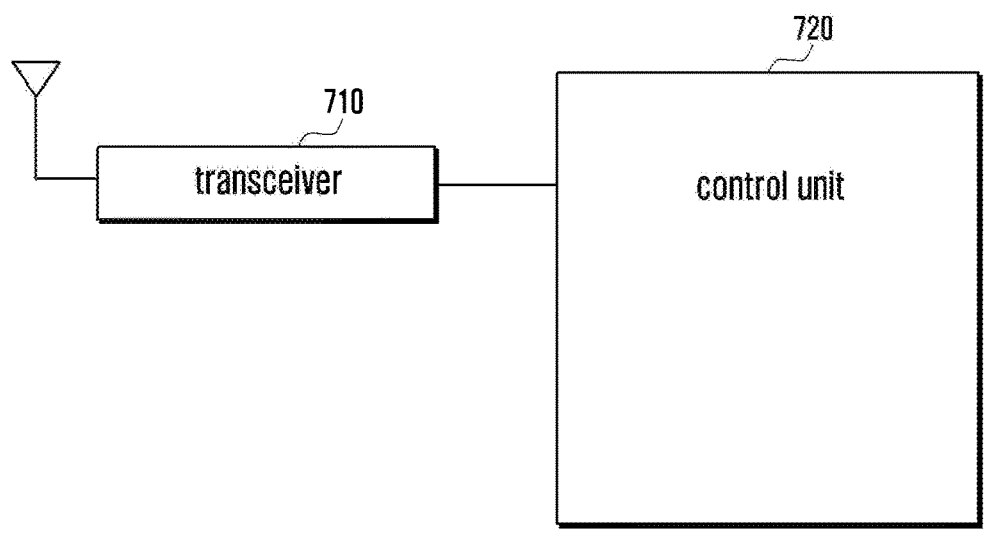
FIG. 7 is a block diagram illustrating a configuration of the base station using different numbers of downlink transmission beams for signal transmission depending on the situation according to an embodiment of the present invention.

FIG. 7 is a block diagram illustrating a configuration of the base station using different numbers of downlink transmission beams for signal transmission depending on the situation according to an embodiment of the present invention.

As shown in FIG. 7, the base station of the present invention includes a transceiver 710 and a control unit 720.

The transceiver 710 is responsible for transmitting and receiving data or signals to and from a terminal or a neighboring base station. The control unit 720 controls overall operations of the base station and signal flows among internal components.

Particularly, the control unit 720 may control the power of downlink transmission beams according to an embodiment of the present invention. In detail, the control unit 720 determines at least one downlink transmission beam for use in downlink transmission. That is, the control unit 720 performs scheduling of determining the number and directions of beams to be used in adaptation to the environment and location of the user to receive the downlink signal.

The control unit 720 may set the total output power to a constant value regardless of the number of downlink transmission beams to be used by adjusting the output gain adjustment value for the respective downlink transmission beams. That is, the control unit 720 calculates the output gain adjustment value per downlink transmission beam based on the number of downlink transmission beams, downlink transmission beam index, and MIMO scheme to be applied to the subcarrier and applies the output gain adjustment value to the respective downlink transmission beams.

Figure 8:
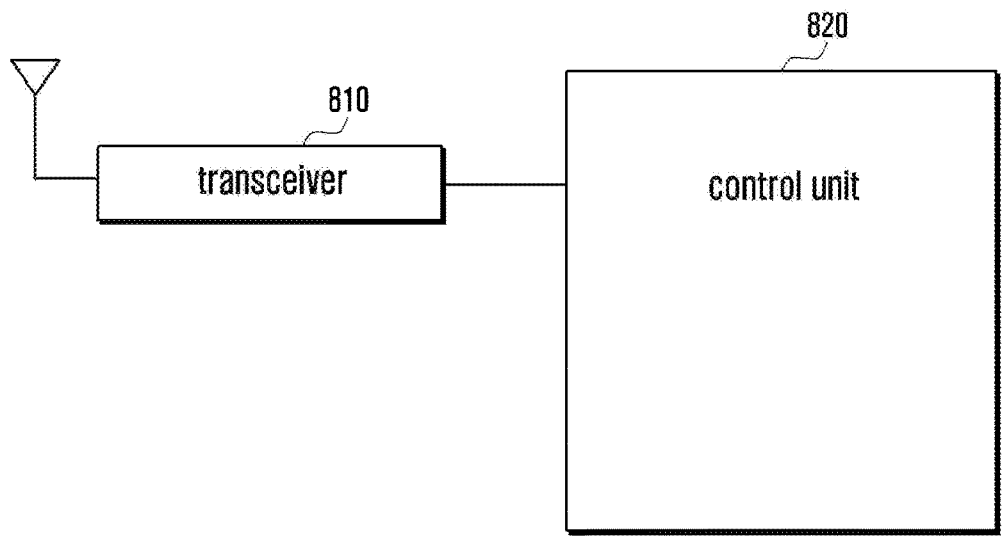
FIG. 8 is a block diagram illustrating a configuration of the terminal using different numbers of uplink transmission beams for uplink signal transmission depending on the situation according to an embodiment of the present invention.

FIG. 8 is a block diagram illustrating a configuration of the terminal using different numbers of uplink transmission beams for uplink signal transmission depending on the situation according to an embodiment of the present invention.

As shown in FIG. 8, the terminal of the present invention includes a transceiver 810 and a control unit 820.

The transceiver 810 is responsible for transmitting and receiving signals to and from a base station. The control unit 820 controls overall operations of the terminal and signal flows among the internal components.

Particularly, the control unit 820 may control the power of uplink transmission beams according to an embodiment of the present invention. In detail, the control unit 820 determines at least one uplink transmission beam for use in downlink transmission. That is, the control unit 820 determines the number and direction of the beams depending on the uplink transmission environment and location of the terminal.

The control unit 820 may set the total output power to a constant value regardless of the number of uplink transmission beams to be used by adjusting the output gain adjustment value for the respective uplink transmission beams. That is, the control unit 820 calculates the output gain adjustment value per uplink transmission beam based on the number of uplink transmission beams, uplink transmission beam index, and MIMO scheme to be applied to the subcarrier and applies the output gain adjustment value to the respective uplink transmission beams.

According to an embodiment of the present invention, the terminal can be any of portable electronic devices including a mobile phone, a Personal Digital Assistant (PDA), a navigation device, a digital broadcast receiver, and a Portable Multimedia Player (PMP).

It is to be appreciated that those skilled in the art can change or modify the embodiments without departing the technical concept of this invention. Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A power control method of a base station in a wireless communication system using a beamforming scheme, the method comprising:
obtaining information indicating a total number of radio frequency (RF) paths in use per subcarrier;
calculating an output gain adjustment value per RF path based on i) the information indicating the total number of RF paths in use per subcarrier and ii) a used multi-input multi-output (MIMO) scheme; and
applying the calculated output gain adjustment value per RF path for transmitting a signal,
wherein the used MIMO scheme is one of a single user-MIMO (SU-MIMO), a spatial division multiple access MIMO (SDMA MIMO), and a non-spatial division multiple access MIMO (non-SDMA MIMO), and
wherein the output gain adjustment value per RF path for the SU-MIMO and the output gain adjustment value per RF path for the non-SDMA MIMO are the same when the total number of RF paths in use per subcarrier are the same for each MIMO scheme.

2. The method of claim 1, wherein the information further comprises an index of each RF path.

3. The method of claim 1, wherein the calculating of the output gain adjustment value comprises setting, if the total number of the RF paths is N and the used MIMO scheme is the SU-MIMO, the output gain adjustment value per RF path to $-10 \times \log_{10} N$ (dB).

4. The method of claim 1, wherein the calculating of the output gain adjustment value comprises setting, if the total number of the RF paths is N and the used MIMO scheme is the SDMA MIMO, the output gain adjustment value per RF path to 0 (dB).

5. The method of claim 1, wherein the calculating of the output gain adjustment value comprises setting, if the total number of RF paths is N and the used MIMO scheme is the non-SDMA MIMO, the output gain adjustment value per RF path to $-10 \times \log_{10} N$ (dB).

6. The method of claim 5, wherein the non-SDMA MIMO is a zero forcing (ZF) MIMO.

7. The method of claim 1, further comprising receiving information for use in determining the RF path from a terminal.

8. A base station for controlling power in a wireless communication system using a beamforming scheme, the base station comprising:
a transceiver configured to transmit and receive signals to and from a terminal; and
at least one processor configured to:
obtain information indicating a total number of radio frequency (RF) paths in use per subcarrier,
calculate an output gain adjustment value per RF path based on i) the information indicating the total number of RF paths in use per subcarrier and ii) a used multi-input multi-output (MIMO) scheme, and
apply the calculated output gain adjustment value per RF path for transmitting a signal,
wherein the used MIMO scheme is one of a single user-MIMO (SU-MIMO), a spatial division multiple access MIMO (SDMA MIMO), and a non-spatial division multiple access MIMO (non-SDMA MIMO), and
wherein the output gain adjustment value per RF path for the SU-MIMO and the output gain adjustment value per RF path for the non-SDMA MIMO are the same when the total number of RF paths in use per subcarrier are the same for each MIMO scheme.

9. The base station of claim 8, wherein the information further comprises an index of each RF path.

10. The base station of claim 8, wherein the at least one processor is further configured to set, if the total number of the RF paths is N and the used MIMO scheme is the SU-MIMO, the output gain adjustment value per RF path to $-10 \times \log_{10} N$ (dB).

11. The base station of claim 8, wherein the at least one processor is further configured to set, if the total number of the RF paths is N and the used MIMO scheme is the SDMA MIMO, the output gain adjustment value per RF path to 0 (dB).

12. The base station of claim 8, wherein the at least one processor is further configured to set, if the total number of RF paths is N and the used MIMO scheme is the non-SDMA MIMO, the output gain adjustment value per RF path to $-10 \times \log_{10} N$ (dB).

13. The base station of claim 8, wherein the non-SDMA MIMO is a zero forcing (ZF) MIMO.

14. The base station of claim 8, further comprising:
a scheduler which collects information; and
a power manager which receives the information from the scheduler and determines the power gain adjustment value per RF path based on the received information.

15. A method of transmitting a signal by a terminal in a wireless communication system using a beamforming scheme, the method comprising:
obtaining information indicating a total number of radio frequency (RF) paths in use per subcarrier;
calculating an output gain adjustment value per RF path based on i) the information indicating the total number of RF paths in use per subcarrier and ii) a used multi-input multi-output (MIMO) scheme; and
applying the calculated output gain adjustment value per RF path for transmitting a signal,
wherein the used MIMO scheme is one of a single user-MIMO (SU-MIMO), a spatial division multiple access MIMO (SDMA MIMO), and a non-spatial division multiple access MIMO (non-SDMA MIMO), and
wherein the output gain adjustment value per RF path for the SU-MIMO and the output gain adjustment value per RF path for the non-SDMA MIMO are the same when the total number of RF paths in use per subcarrier are the same for each MIMO scheme.

16. The method of claim 15, wherein the information further comprises an index of each RF path.

17. The method of claim 15, wherein the output gain adjustment value is set to $-10 \times \log_{10} N$ (dB) if the total number of the RF paths is N and the used MIMO scheme is the SU-MIMO.

18. The method of claim 16, wherein the output gain adjustment value is set to 0 (dB) if the number of the RF paths is N and the used MIMO scheme is the SDMA MIMO.

19. The method of claim 16, wherein the output gain adjustment value is set to $-10 \times \log_{10} N$ (dB) if the total number of RF paths is N and the used MIMO scheme is the non-SDMA MIMO.

\* \* \* \* \*